United States Patent [19]
Campbell et al.

[11] Patent Number: 5,801,374
[45] Date of Patent: Sep. 1, 1998

[54] PRECISION OPTICAL SENSOR PACKAGING

[75] Inventors: Hugh P. Campbell, Gardena; Rheinhold W. Behringer, Thousand Oaks, both of Calif.

[73] Assignee: Rockwell International, Costa Mesa, Calif.

[21] Appl. No.: 740,798

[22] Filed: Nov. 4, 1996

[51] Int. Cl.$^6$ ........................................... G01J 1/42
[52] U.S. Cl. ..................... 250/208.2; 250/216; 359/626
[58] Field of Search ............................. 250/208.2, 216, 250/239; 359/619, 707, 626

[56] References Cited

U.S. PATENT DOCUMENTS

| | | | |
|---|---|---|---|
| 4,695,719 | 9/1987 | Wilwerding | 250/208.2 |
| 5,552,596 | 9/1996 | Ravetto et al. | 250/208.2 |

*Primary Examiner*—Edward P. Westin
*Assistant Examiner*—Kevin Pyo
*Attorney, Agent, or Firm*—Kyle Eppele; L. Keith Stephens; James P. O'Shaughnessy

[57] ABSTRACT

Conventional packaging of optical sensors is of little assistance in determining the location and attitude of the focal place of the sensor 10, since package tolerances lack the requisite precision. Each sensor 10 must be separately focused to its optical assembly 40. Such focusing is expensive, as is the package itself. This invention instead mounts the sensor 10 directly onto one face 28 of a transparent plate 18. Radiation is focused through the plate 18 and onto the sensor 10. Precision alignment targets 12, 22 are formed separately on the sensor 10 (providing a known location of the active image area 14 with respect to the target 12) and on the plate 18 (providing a known location of the edges 24 of the plate 18 with respect to the target 22). The targets 12, 22 are aligned, and contact pads 16, 30 on the sensor 10 and on the plate 18 are joined by electronically conductive bumps 36 of known thickness. The plate 18 itself is of known thickness. The location and attitude of the edges 24 of the plate 18, and of the opposite side 46 of the plate 18, may readily be determined, yet these locations and attitudes are all that is required to determine the location and attitude of the active image area 14, and thus to place the active image area 14 precisely in the focal plane of the optics 40. Moreover, microlenses 52 may be formed in the plate 18, one for each sensor cell 48 in the active image area 14, thereby greatly enhancing the light-gathering capacity of the sensor 10.

12 Claims, 3 Drawing Sheets

PRECISION OPTICAL SENSOR PACKAGING

BACKGROUND OF THE INVENTION

This invention relates to electro-optical sensors, and has particular relation to construction of a device in which the sensor may be manufactured to automatically lie in the focal plane of the optics, without the necessity of directly measuring the location and attitude of the (fragile) sensor, and without the necessity of actively focusing an image onto the sensor.

Conventional packaging of optical sensors has generally followed conventional packaging of dies: a die is placed in a plastic or ceramic housing; wire bonding makes the electrical connection to the die; and a lid is placed (or molded) over the opening. The location and attitude of the package may readily be determined, but this is of little assistance in determining the location and attitude of the die (focal place of the sensor), since package tolerances lack the requisite precision. Each sensor must be separately focused to its optical assembly, which is expensive. The package itself is also expensive.

SUMMARY OF THE INVENTION

The present invention overcomes this defect in the prior art by mounting the sensor directly onto one face of a transparent plate. Radiation is focused through the plate and onto the sensor. Precision alignment targets are formed separately on the sensor (providing a known location of the active image area with respect to the target) and on the plate (providing a known location of the edges of the plate with respect to the target). The targets are aligned, and contact pads on the sensor and on the plate are joined by electronically conductive bumps of known thickness. The plate itself is of known thickness. The location and attitude of the edges of the plate, and of the opposite side of the plate, may readily be determined, yet these locations and attitudes are all that is required to determine the location and attitude of the active image area, and thus to place the active image area precisely in the focal plane of the optics. Moreover, microlenses may be formed in the plate, one for each pixel in the active image area, thereby greatly enhancing the light-gathering capacity of the sensor.

DETAILED DESCRIPTION OF THE DRAWINGS

Figure 1:
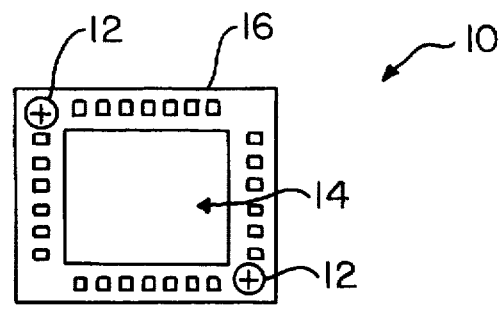
FIG. 1 is a plan view of the sensor.

FIG. 1 is a plan view of the electronic sensor 10. It has at least two sensor alignment targets 12. More may be used if desired, but two are sufficient to fix the location and attitude of the sensor 10. The sensor has an active image area 14, and the active image area 14 has a known location with respect to the sensor alignment targets 12. A plurality of sensor bonding pads 16 are connected to the active image area 14.

Figure 2:
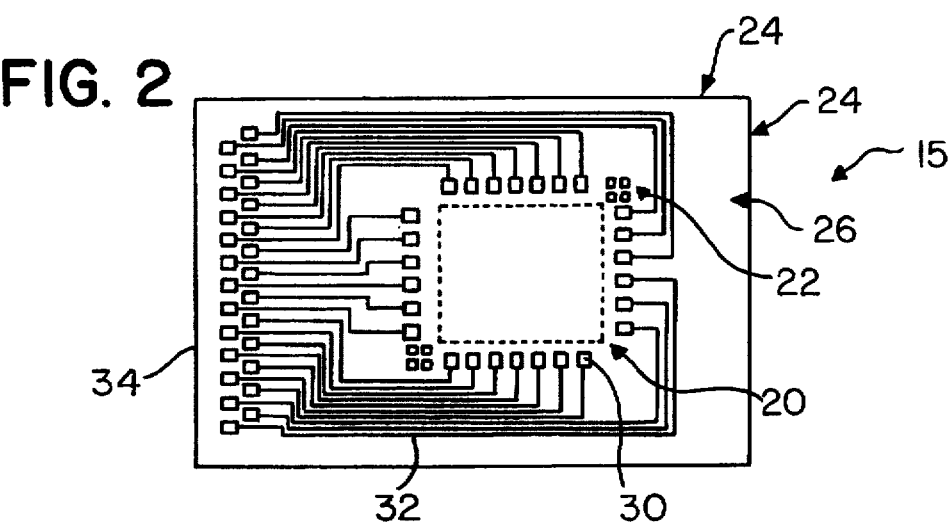
FIG. 2 is a plan view of the plate.

FIG. 2 is a plan view of the plate 18. It is transparent and has a known thickness. Transparency is required only for the portion 20 of the plate 18 which will be in registration with the active image area 14. It also has at least two plate alignment targets 22, one for each of the sensor alignment targets 12. The plate alignment targets 22 have a configuration congruent to the configuration of the sensor alignment targets 12, thereby allowing them to be aligned and placed in registration with one another.

The plate 18 has at least two edges 24, the edges 24 having known locations with respect to the plate alignment targets 22. Two edges 24 are sufficient to fix the location and attitude of the plate 18, and this configuration is preferred. A single edge 24 with an alignment marker 26 would also be sufficient to fix the location and attitude of the plate 18, as would a pair of alignment markers 26. Edge 24 and alignment marker 26 are both referred to herein as "alignment indicators".

On one face, the first face 28, of the plate 18 are a plurality of plate bonding pads 30, one for each of the sensor bonding pads 16. The plate bonding pads 30 have a configuration in registration with the configuration of the sensor bonding pads 16 when the plate alignment targets 30 are in registration with the sensor alignment targets 12.

Signal transfer apparatus 32 is connected to the plate bonding pads. In FIG. 2, these are shown as conductive traces 32 extending toward the left edge 34 of the plate 18. It is convenient to have some edges be registration edges 24, and other edges be signal transfer edges 34, and FIG. 2 shows this.

Figure 3:
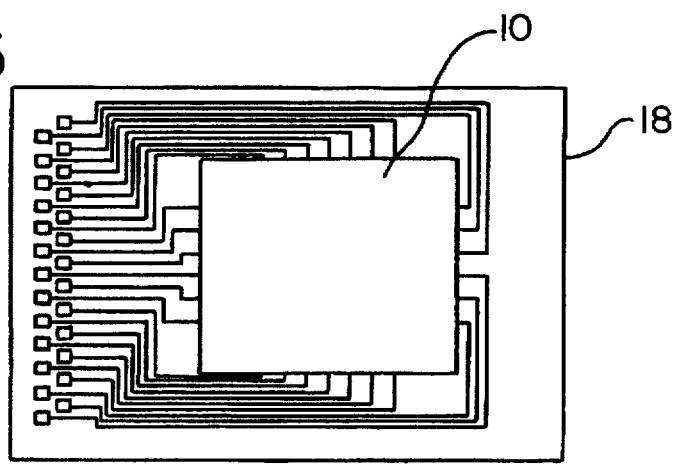
FIG. 3 is a plan view of the sensor mounted on the plate.

FIG. 3 is a plan view of the sensor 10 mounted on the plate 18, the sensor 10 having first been inverted. A plurality of electronically conductive bumps 36, of known thickness, are placed on the bonding pads 16, 30, one bump 36 between each respective sensor bonding pad 16 and plate bonding pad 30 in registration with the respective sensor bonding pad 16. "Bump," as used herein, includes "solder ball." The exact material or technology is of lesser importance; what is of greater importance is that the bump be conductive and of a known thickness.

Figure 4:
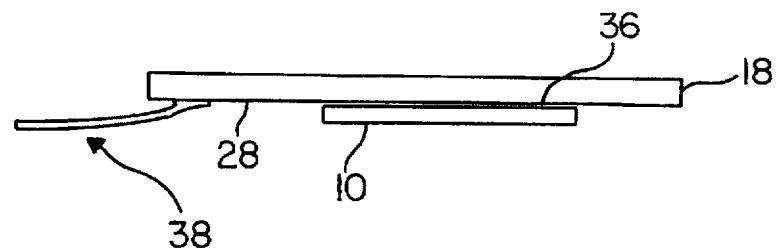
FIG. 4 is a side view of the sensor mounted on the plate.

FIG. 4 is a side view of the sensor 10 mounted on the underside 28 of the plate 18. The bumps 36 are seen between the sensor 10 and the plate 18. The bumps 36 may be placed on the bonding pads 16, 30 of either the sensor 10 or the plate 18 (or some of each), as is most convenient for the application at hand. A signal transfer apparatus, such as the flex circuit interconnection 38 shown extending from the left side 34 of the plate 18, transfers signals from the sensor 10 to processing apparatus. Another signal transfer apparatus would be a plurality of leads (ribbon cable, conductive elastomere, etc.) extending just beyond a die upon which the sensor is formed. Such a package would desirably provide a small package profile.

The processing apparatus itself forms no part of the present invention and is accordingly not shown.

Figure 5:
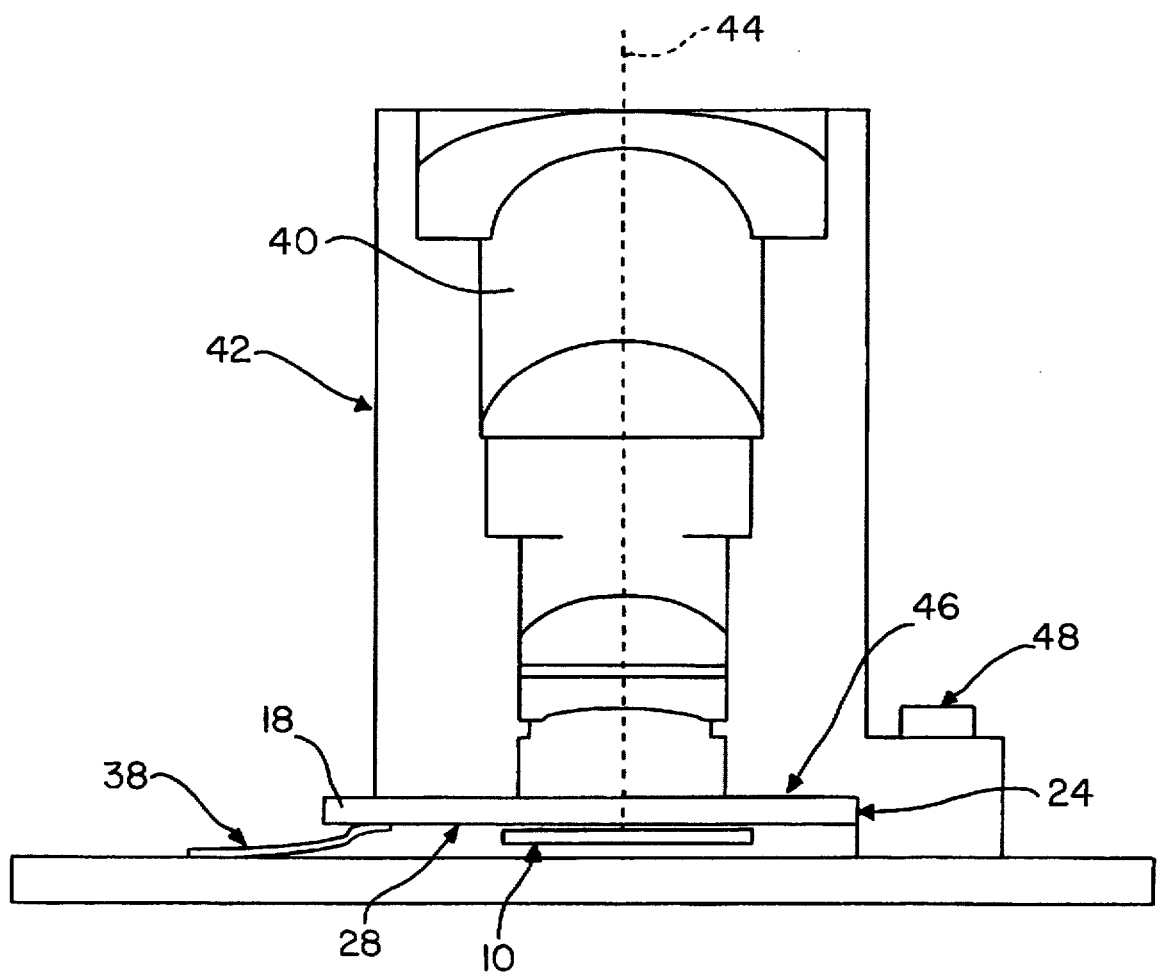
FIG. 5 is a side view of the sensor, plate, and associated optics.

FIG. 5 is a side view of the sensor 10, plate 18, and associated optics 40. The optical apparatus 40 has a housing 42 and an optical axis 44. It also has a known location and attitude with respect to the edges 24 and a second face 46 of the plate 18. The most convenient way of doing this is to place the optical apparatus 40 in contact with the second face 46 of the plate 18, that is, the face 46 opposite the face 28 upon which the sensor 10 has been mounted.

The foregoing apparatus may be manufactured by providing the above-described electronic sensor 10 (including alignment targets 12, active image area 14, and sensor bonding pads 16); further providing the above-described transparent plate 18 (including plate alignment targets 22, edges 24, plate bonding pads 30, and signal transfer apparatus 32); applying the bumps 36; placing the plate alignment targets 22 and the sensor alignment targets 12 in alignment; and connecting the sensor 10 to the plate 18 through the bumps 36. If this is done, the optical apparatus 40 may be aligned with respect to the edges 24 and second face 46 of the plate 18, thereby adapting the formation of a focused image on the active image area 14 without the necessity of directly measuring the location and attitude of the optical apparatus 40 with respect to the sensor 10, and without the necessity of actively focusing an image onto the active image area 14. As before, the preferred method is for the optical apparatus 40 to be in contact with the second face 46 of the plate 18.

Figure 6:
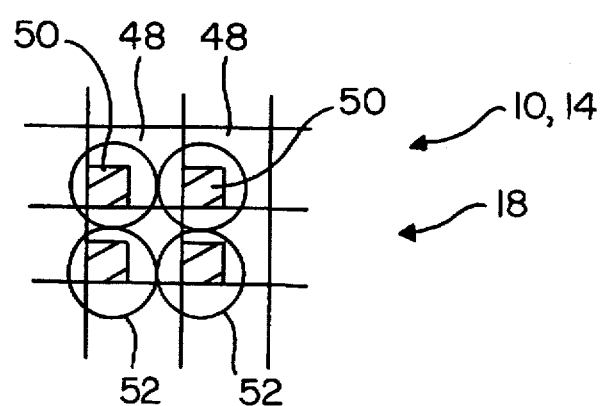
FIG. 6 is a magnified plan view of a portion of the sensor, as seen through the plate.

FIG. 6 is a magnified plan view of a portion of the sensor 10, as seen through the plate 18. The active image area 14 includes an array of sensor cells 48, each sensor cell 48 including a light sensitive region 50 having an area less than the area of the sensor cell 48. The plate 18 includes an array of microlenses 52, each microlens 52 being situated to focus light onto the light sensitive region 50 of a respective sensor cell 48. The light sensitive region 50 of each sensor cell 48 is typically a photo diode. Use of microlenses 52 produces a larger fill factor and a higher sensor sensitivity. Precise alignment is achieved by exploiting the alignment targets 12, 22 for mounting the sensor 10 onto the plate 18. Precise alignment greatly enhances the desired sensitivity increase.

SCOPE OF THE INVENTION

While several embodiments have been described in some detail, the true scope and spirit of the present invention is not limited thereto, but is limited only by the appended claims and their equivalents.

What is claimed is:
1. An article of manufacture comprising:
 (a) an electronic sensor including:
  (1) at least two sensor alignment targets;
  (2) an active image area, the active image area having a known location with respect to the sensor alignment targets; and
  (3) a plurality of sensor bonding pads connected to the active image area;
 (b) a transparent plate of known thickness including:
  (1) at least two plate alignment targets, the plate alignment targets having a configuration congruent to a configuration of the sensor alignment targets;
  (2) at least two alignment indicators, the alignment indicators having known locations with respect to the plate alignment targets;
  (3) a like plurality of plate bonding pads on a first face of the plate, the plate bonding pads having a configuration in registration with the configuration of the sensor bonding pads when the plate alignment targets are in registration with the sensor alignment targets; and
  (4) signal transfer apparatus connected to the plate bonding pads; and
 (c) a like plurality of electronically conductive bumps, of known thickness, one bump between each respective sensor bonding pad and plate bonding pad in registration with the respective sensor bonding pad.

2. The article of manufacture of claim 1, further comprising an optical apparatus having a known location and attitude with respect to the alignment indicators and a second face of the plate.

3. The article of manufacture of claim 2, wherein the optical apparatus is in contact with the second face of the plate.

4. The article of claim 1, wherein:
 (a) the active image area comprises an array of sensor cells, each sensor cell including a light sensitive region having an area less than the area of the sensor cell; and
 (b) the plate includes an array of microlenses, each microlens being situated to focus light onto the light sensitive region of a respective sensor cell when the plate alignment targets and the sensor alignment targets are placed in alignment.

5. The article of manufacture of claim 4, further comprising an optical apparatus having a known location and attitude with respect to the alignment indicators and a second face of the plate.

6. The article of manufacture of claim 5, wherein the optical apparatus is in contact with the second face of the plate.

7. A method of manufacturing an article, comprising the steps of:
 (a) providing an electronic sensor including:
  (1) at least two sensor alignment targets;
  (2) an active image area, the active image area having a known location with respect to the sensor alignment targets; and
  (3) a plurality of sensor bonding pads connected to the active image area;
 (b) providing a transparent plate of known thickness including:
  (1) at least two plate alignment targets, the plate alignment targets having a configuration congruent to a configuration of the sensor alignment targets;
  (2) at least two alignment indicators, the alignment indicators having known locations with respect to the plate alignment targets;
  (3) a like plurality of plate bonding pads on a first face of the plate, the plate bonding pads having a configuration in registration with the configuration of the sensor bonding pads when the plate alignment targets are in registration with the sensor alignment targets; and
  (4) signal transfer apparatus connected to the plate bonding pads; and
 (c) applying a like plurality of electronically conductive bumps, of known thickness, one bump to each respective sensor bonding pad or plate bonding pad in registration with the respective sensor bonding pad;
 (d) placing the plate alignment targets and the sensor alignment targets in alignment; and
 (e) connecting the sensor to the plate through the bumps.

8. The method of claim 7, further comprising the step of aligning an optical apparatus with respect to the alignment indicators and a second face of the plate, thereby adapting the formation of a focused image on the active image area without the necessity of directly measuring the location and attitude of the optical apparatus with respect to the sensor, and without the necessity of actively focusing an image onto the active image area.

9. The method of claim 8, wherein the optical apparatus is in contact with the second face of the plate.

10. The method of claim 7, wherein:
 (a) the active image area comprises an array of sensor cells, each sensor cell including a light sensitive region having an area less than the area of the sensor cell; and
 (b) the plate includes an array of microlenses, each microlens being situated to focus light onto the light sensitive region of a respective sensor cell when the plate alignment targets and the sensor alignment targets are placed in alignment.

11. The method of claim 10, further comprising the step of aligning an optical apparatus, having a known location and attitude, with respect to the alignment indicators and a second face of the plate, thereby adapting the formation of a focused image on the active image area without the necessity of directly measuring the location and attitude of the optical apparatus with respect to the sensor, and without the necessity of actively focusing an image onto the active image area.

12. The method of claim 11, wherein the optical apparatus is in contact with the second face of the plate.

* * * * *